US012322876B2

(12) United States Patent
Chen et al.

(10) Patent No.: US 12,322,876 B2
(45) Date of Patent: Jun. 3, 2025

(54) MULTI-BAND ANTENNAS HAVING ENHANCED DIRECTORS THEREIN THAT INHIBIT RADIATION INTERFERENCE ACROSS MULTIPLE FREQUENCY BANDS

(71) Applicant: Outdoor Wireless Networks LLC, Claremont, NC (US)

(72) Inventors: Changfu Chen, Suzhou (CN); Runmiao Wu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 272 days.

(21) Appl. No.: 18/185,332

(22) Filed: Mar. 16, 2023

(65) Prior Publication Data

US 2023/0291103 A1 Sep. 14, 2023

Related U.S. Application Data

(63) Continuation of application No. 17/181,443, filed on Feb. 22, 2021, now Pat. No. 11,637,373.

(30) Foreign Application Priority Data

Mar. 24, 2020 (CN) ......................... 202010212479.0

(51) Int. Cl.
*H01Q 5/392* (2015.01)
*H01Q 1/52* (2006.01)
(Continued)

(52) U.S. Cl.
CPC ............. *H01Q 5/392* (2015.01); *H01Q 1/523* (2013.01); *H01Q 5/335* (2015.01); *H01Q 5/42* (2015.01); *H01Q 5/50* (2015.01); *H01Q 9/0407* (2013.01)

(58) Field of Classification Search
CPC .......... H01Q 1/52; H01Q 1/521; H01Q 1/523; H01Q 1/525; H01Q 21/26; H01Q 9/0407;
(Continued)

(56) References Cited

U.S. PATENT DOCUMENTS

| | | | | |
|---|---|---|---|---|
| 8,994,602 | B2 | 3/2015 | Plet et al. | |
| 9,263,798 | B1 * | 2/2016 | Piazza | H01Q 21/29 |
| 2020/0303820 | A1 * | 9/2020 | Jang | H01Q 15/14 |

FOREIGN PATENT DOCUMENTS

| | | | |
|---|---|---|---|
| EP | 3614491 | A1 | 2/2020 |
| KR | 101829816 | B1 | 2/2018 |

(Continued)

OTHER PUBLICATIONS

"Communication with European Search Report", EP Application No. 21162590.0, Aug. 10, 2021.

*Primary Examiner* — Daniel Munoz
(74) *Attorney, Agent, or Firm* — Myers Bigel, P.A.

(57) ABSTRACT

An antenna includes a reflector, a radiating element extending forwardly of the reflector, and a director positioned forwardly of the radiating element. The director includes a plurality of passive impedance elements that provide frequency-dependent reactances to currents induced therein responsive to electromagnetic radiation generated by the radiating element. The plurality of passive impedance elements include: (i) a primary capacitive element, (ii) a first series LC circuit having a first inductor therein electrically connected to a first portion of the primary capacitive element, and (iii) a second series LC circuit having a second inductor therein electrically connected to a second portion of the primary capacitive element.

20 Claims, 11 Drawing Sheets

310

(51) Int. Cl.
*H01Q 5/335* (2015.01)
*H01Q 5/42* (2015.01)
*H01Q 5/50* (2015.01)
*H01Q 9/04* (2006.01)

(58) Field of Classification Search
CPC .......... H01Q 5/392; H01Q 5/335; H01Q 5/42; H01Q 5/50
See application file for complete search history.

(56) References Cited

FOREIGN PATENT DOCUMENTS

| | | | |
|---|---|---|---|
| WO | 2013104108 | A1 | 7/2013 |
| WO | WO-2018076192 | A1 * | 5/2018 |

* cited by examiner

230

240

250

260

330

340

MULTI-BAND ANTENNAS HAVING ENHANCED DIRECTORS THEREIN THAT INHIBIT RADIATION INTERFERENCE ACROSS MULTIPLE FREQUENCY BANDS

REFERENCE TO PRIORITY APPLICATIONS

This application is a continuation of U.S. application Ser. No. 17/181,443, filed Feb. 22, 2021, now U.S. Pat. No. 11,637,373, which claims priority to Chinese Patent Application No. 202010212479.0, filed Mar. 24, 2020, the disclosures of which are hereby incorporated herein by reference.

FIELD OF THE INVENTION

The present invention relates to communication systems and, more particularly, to multi-band antennas and radiating element assemblies that are suitable for communication systems.

DESCRIPTION OF RELATED ART

A director is a device that is mounted adjacent a radiating element in order to: (i) tune a radiation pattern of the radiating element, such as a lobe width of the radiation pattern, and/or (ii) improve a return loss (RL) of the radiating element. A dimension and shape of the director will affect its working frequency band. Therefore, the dimension and shape of the director may need to be adjusted according to an operating frequency of the radiating element that the director serves. A distance between the director and the radiating element that the director serves will also affect the tuning of the radiation pattern. Accordingly, the distance between the director and the radiating element may also need to be adjusted to achieve a desired radiation pattern.

SUMMARY OF THE INVENTION

An enhanced multi-band antenna according to some embodiments of the invention includes a first radiating element configured to emit first electromagnetic radiation in response to at least one feed signal having a frequency within a first radio frequency (RF) band. A director is also provided, which is positioned forwardly of the first radiating element, and directly in a path of the first electromagnetic radiation. The director includes first and second passive impedance elements, which provide respective first and second frequency-dependent reactances to first currents, which are induced within the director in response to the first electromagnetic radiation.

In some of these embodiments, the first and second passive impedance elements include a first inductor and a first capacitor, which are electrically coupled in series. For example, the director may be configured to include a plurality of passive impedance elements that are connected within a closed impedance loop, which contains a second LC circuit in series with a first LC circuit. As another example, the director may be configured to include a plurality of passive impedance elements that are connected within a closed resonant loop containing a third LC circuit in series with a second LC circuit, which is in series with a first LC circuit.

In some other embodiments of the invention, the director is positioned adjacent a path of second electromagnetic radiation emitted by a second radiating element, and the director is configured to provide a greater frequency-dependent impedance to second currents induced within the director in response to the second electromagnetic radiation relative to the first currents. In addition, a distance between the director and a forward-facing surface of the first radiating element may be in a range from λ/8 to 3λ/8 (e.g., λ/4), where λ is equivalent to a wavelength of a center frequency within the first RF band (and the director extends parallel to radiating arms within the first radiating element).

According to further embodiments of the invention, a geometric shape of the capacitor in the first LC circuit is equivalent to a geometric shape of the capacitor in the second LC circuit, and a geometric shape of the inductor in the first LC circuit is equivalent to a geometric shape of the inductor in the second LC circuit. The geometric shape of the capacitor in the first LC circuit may be selected from a group consisting of four-sided polygons (e.g., rectangles, diamond-shape), triangles, circles, and circular sectors.

In still further embodiments of the invention, a multi-band antenna includes: (i) a reflector, (ii) a first array of first radiating elements, which extend in a lengthwise direction along a first side of the reflector, and (iii) a second array of first radiating elements, which extend in a lengthwise direction along a second side of the reflector. An array of second radiating elements is also provided, which extends in a lengthwise direction across the reflector, and between the first and second arrays of first radiating elements. An array of directors is provided, which extends forwardly of the first radiating elements within the first array. The directors are configured to include respective closed resonant loops of inductor and capacitor elements connected in series. Advantageously, each of the resonant loops provides a frequency-dependent impedance that is greater with respect to second currents, which are induced within the resonant loops in response to radiation from the second radiating elements, relative to first currents, which are induced within the resonant loops in response to radiation from the first radiating elements. In some embodiments, each of the resonant loops includes an alternating arrangement of inductors and capacitors. And, a geometric shape of the capacitors may be selected from a group consisting of four-sided polygons (e.g., rectangles), triangles, circles, and circular sectors. In some embodiments, all of the capacitors within a respective loop have equivalent shapes and area; but, in other embodiments, some of the capacitors within a respective loop have different shapes and area.

According to still further embodiments of the invention, a multi-band antenna is provided, which includes a first radiating element configured to emit first electromagnetic radiation in response to at least one feed signal having a frequency within a first radio frequency (RF) band. A director is provided, which is positioned forwardly of the first radiating element, and in a path of the first electromagnetic radiation. The director includes a two-dimensional grid-shaped inductor. In some of these embodiments, the two-dimensional grid-shaped inductor has a two-dimensional array of openings therein. And, a side dimension of the openings may be equal to λ/10, where λ is equivalent to a wavelength of a center frequency within the first electromagnetic radiation. The two-dimensional array of openings may be larger than a two-by-two array of openings.

BRIEF DESCRIPTION OF THE DRAWINGS

The accompanying drawings, which constitute a part of the specification, illustrate embodiments of the present invention and, together with the description, serve to explain the principles of the present invention.

Figure 1A:
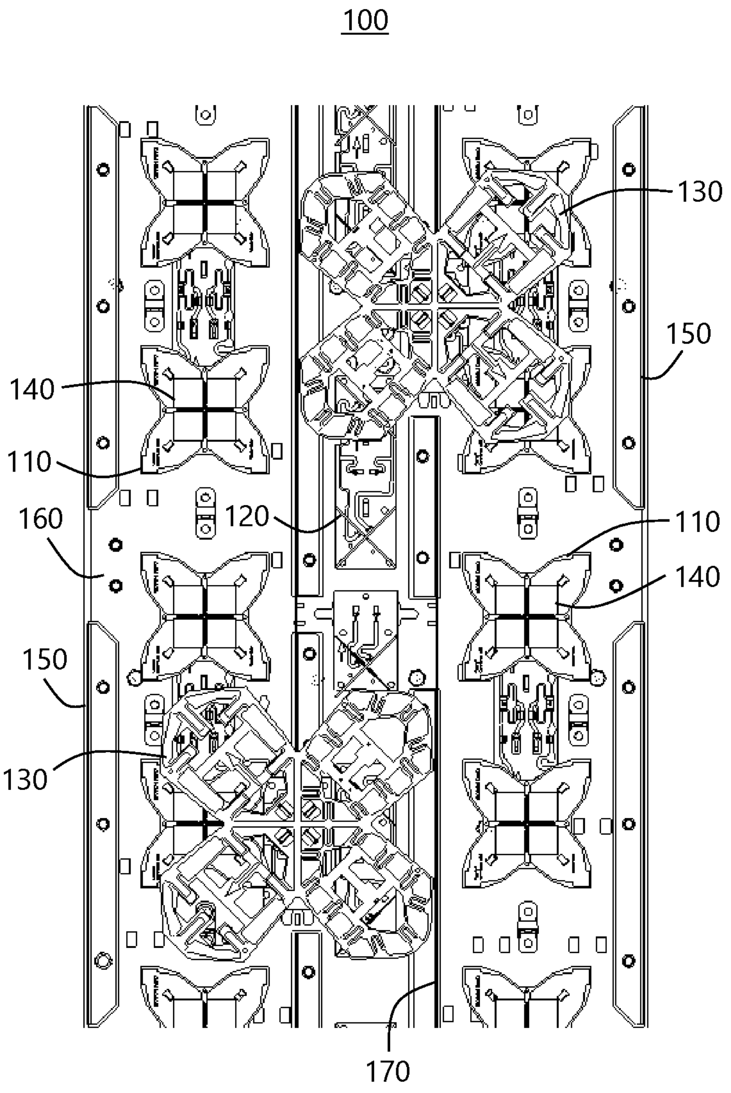
FIG. 1λ is a front view schematically showing a portion of a multi-band antenna according to an embodiment of the present invention.
FIG. 1B is a side view schematically showing the portion of the multi-band antenna of FIG. 1A.
FIG. 1C is a perspective view schematically showing the portion of the multi-band antenna of FIG. 1A.
FIG. 1D is a front view schematically showing one of the directors included in the multi-band antenna of FIG. 1A.

Note, that in some cases the same elements or elements having similar functions are denoted by the same reference numerals in different drawings, and description of such elements is not repeated. In some cases, similar reference numerals and letters are used to refer to similar elements, and thus once an element is defined in one figure, it need not be further discussed in subsequent figures.

In order to facilitate understanding, the position, dimension, range, or the like of each structure illustrated in the drawings may not be drawn to scale. Thus, the invention is not necessarily limited to the position, dimension, range, or the like as disclosed in the drawings.

DETAILED DESCRIPTION

The present invention will be described with reference to the accompanying drawings, which show a number of example embodiments thereof. It should be understood, however, that the present invention can be embodied in many different ways, and is not limited to the embodiments described below. Rather, the embodiments described below are intended to make the disclosure of the present invention more complete and fully convey the scope of the present invention to those skilled in the art. It should also be understood that the embodiments disclosed herein can be combined in any way to provide many additional embodiments.

The terminology used herein is for the purpose of describing particular embodiments, but is not intended to limit the scope of the present invention. All terms (including technical terms and scientific terms) used herein have meanings commonly understood by those skilled in the art unless otherwise defined. For the sake of brevity and/or clarity, well-known functions or structures may be not described in detail.

Herein, when an element is described as located "on" "attached" to, "connected" to, "coupled" to or "in contact with" another element, etc., the element can be directly located on, attached to, connected to, coupled to or in contact with the other element, or there may be one or more intervening elements present. In contrast, when an element is described as "directly" located "on", "directly attached" to, "directly connected" to, "directly coupled" to or "in direct contact with" another element, there are no intervening elements present. In the description, references that a first element is arranged "adjacent" a second element can mean that the first element has a part that overlaps the second element or a part that is located above or below the second element.

Herein, the foregoing description may refer to elements or nodes or features being "connected" or "coupled" together. As used herein, unless expressly stated otherwise, "connected" means that one element/node/feature is electrically, mechanically, logically or otherwise directly joined to (or directly communicates with) another element/node/feature. Likewise, unless expressly stated otherwise, "coupled" means that one element/node/feature may be mechanically, electrically, logically or otherwise joined to another element/node/feature in either a direct or indirect manner to permit interaction even though the two features may not be directly connected. That is, "coupled" is intended to encompass both direct and indirect joining of elements or other features, including connection with one or more intervening elements.

Herein, terms such as "upper", "lower", "left", "right", "front", "rear", "high", "low" may be used to describe the spatial relationship between different elements as they are shown in the drawings. It should be understood that in addition to orientations shown in the drawings, the above terms may also encompass different orientations of the device during use or operation. For example, when the device in the drawings is inverted, a first feature that was described as being "below" a second feature can be then described as being "above" the second feature. The device may be oriented otherwise (rotated 90 degrees or at other orientation), and the relative spatial relationship between the features will be correspondingly interpreted.

Herein, the term "A or B" used through the specification refers to "A and B" and "A or B" rather than meaning that A and B are exclusive, unless otherwise specified The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the detailed description.

Herein, the term "substantially", is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

Herein, certain terminology, such as the terms "first", "second" and the like, may also be used in the following description for the purpose of reference only, and thus are not intended to be limiting. For example, the terms "first", "second" and other such numerical terms referring to structures or elements do not imply a sequence or order unless clearly indicated by the context.

Further, it should be noted that the terms "comprise", "include", "have" and any other variants, as used herein, specify the presence of stated features, steps, operations, elements, and/or components, but do not preclude the presence or addition of one or more other features, steps, operations, elements, components, and/or groups thereof.

In a multi-band antenna, a director that is mounted, for example, forwardly of a first radiating element that has a first operating frequency band may affect a radiation pattern of a second radiating element having a second operating frequency band. A multi-band antenna according to an embodiment of the present invention includes a first radiating element configured to emit electromagnetic radiation within a first operating frequency band, a second radiating element configured to emit electromagnetic radiation within a second operating frequency band, and a director configured to shape the radiation pattern of the first radiating element. The director is frequency selective so as to be substantially invisible to electromagnetic radiation within at least a portion of the second operating frequency band. Consequently, a director that is associated with the first radiating element may have a reduced impact on the radiation pattern of the second radiating element. Embodiments of the present invention further provide radiating element assemblies including frequency selective directors, and frequency selective directors. Directors herein are also referred to as "parasitic elements" or "parasitic element assemblies" in some embodiments.

FIGS. 1A to 1D are schematic diagrams of a portion of a multi-band antenna 100 according to an embodiment of the present invention. The multi-band antenna 100 may be mounted for operation on a raised structure, such as an antenna tower, a telegraph pole, a building, a water tower, etc., such that a longitudinal axis of the antenna 100 extends substantially perpendicular to the ground. The antenna 100 usually includes a radome (not shown) that provides environmental protection. The multi-band antenna 100 includes a reflector 160, which may comprise a metal surface that provides a ground plane and reflects electromagnetic radiation reaching it such that the electromagnetic radiation is redirected to propagate forwardly, for example. The antenna 100 may further include additional mechanical and electronic components, such as one or more of connectors, cables, phase shifters, remote electronic tilt (RET) units, duplexers, and the like, arranged on a rear side of the reflector 160.

The multi-band antenna 100 further includes an array of radiating elements 110, an array of radiating elements 120, and an array of radiating elements 130 that are arranged on a front side of the reflector 160. In the illustrated embodiment, an operating frequency band of the radiating elements 110 may be, for example, 1695 to 2690 MHz (hereinafter abbreviated as VB) or a sub-band thereof (e.g., 1695 to 2200 MHZ, 2300 to 2690 MHz, or the like). An operating frequency band of the radiating element 120 may be, for example, 3.1 to 4.2 GHZ (hereinafter abbreviated as SB) or a sub-band thereof. An operating frequency band of the radiating element 130 may be, for example, 694 to 960 MHz (hereinafter abbreviated as RB) or a sub-band thereof. The array of VB radiating elements 110 includes two vertically-extending linear arrays that are adjacent in a horizontal direction.

According to how these radiating elements 110 are fed, the two linear arrays may be configured to form two separate antenna beams, or may be configured to form a single antenna beam. The array of SB radiating elements 120 extends vertically and is disposed between these two linear arrays. The array of RB radiating elements 130 extends vertically and is disposed between the two linear arrays. The radiating elements 130 are staggered horizontally a slight offset to either side of the longitudinal axis of the antenna 100, so as to obtain a narrower antenna beam in the azimuth plane.

The multi-band antenna 100 further includes parasitic elements 150, 170 extending forwardly from the reflector 160. The parasitic elements 150 are disposed near both edges of the reflector 160 outside of each linear array of radiating elements 110 so as to tune the pattern of the antenna beam generated by the two linear arrays of radiating elements 110. The parasitic elements 170 are disposed on both sides of the array of radiating elements 120, and between the array of the radiating elements 120 and each linear array of radiating elements 110 so as to improve the isolation between the radiating elements 120 and the radiating elements 110 and to tune the pattern of the antenna beam generated by the array of radiating elements 120.

The multi-band antenna 100 further includes a plurality of directors 140 for the VB radiating elements 110, respectively. In the illustrated embodiment, radiating arms of the radiating element 110 define a first plane, and the director 140 extends substantially parallel to the first plane. The center of each director 140 may be positioned on or near a maximum radiation direction of the corresponding radiating element 110. For example, a projection of the director 140 on the first plane is basically located in a center section of a projection of the radiating element 110 on the first plane, so as to tune the radiation pattern and the return loss of the radiating element 110. A distance from the director 140 to the first plane, which affects the tuning, may be adjusted as needed. In an embodiment, the distance from the director 140 to the first plane is configured to be around ¼ of a wavelength corresponding to a center frequency of the electromagnetic radiation that is emitted by the radiating element 110. In another embodiment, the distance from the director 140 to the first plane is configured to be ⅛ to ⅜ of the wavelength corresponding to the center frequency of the electromagnetic radiation that is emitted by the radiating element 110. Unless otherwise specified herein, a "wavelength" herein refers to the wavelength of an electromagnetic wave in a vacuum or air.

Figure 5:
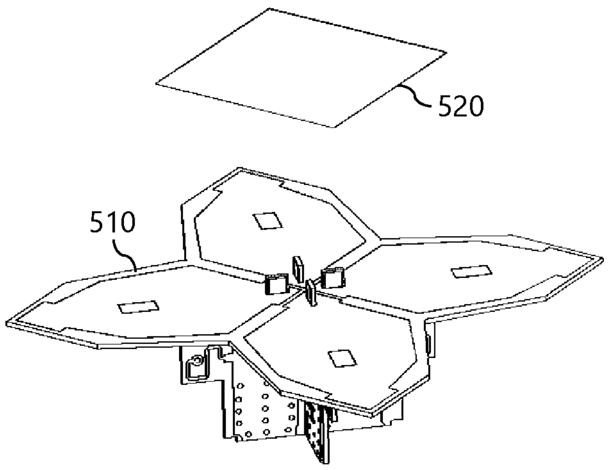
FIG. 5 is a perspective view schematically showing a radiating element assembly having a known director.

A dimension of the projection of the director 140 on the first plane (for example, the diagonal dimension) may be around ¼ of the wavelength corresponding to the center frequency of the electromagnetic radiation that is emitted by the radiating element 110. If the director 140 that is associated with one of the radiating elements 110 in antenna 100 is replaced with a conventional director 520 that is illustrated in FIG. 5, the dimension of the director 520, which is around ¼ of the wavelength corresponding to the center frequency of the VB, may be approximately equal to ½ of the wavelengths corresponding to at least some of the frequencies within the SB (i.e., within the operating frequency band of the radiating elements 120). Thus, the director 520 will generate a relatively strong secondary radiation when the radiating elements 120 are transmitting or receiving electromagnetic radiation at a subset of the frequencies in the 3.1-4.2 GHZ frequency band, so as to impact the radiation pattern of the SB radiating elements 120. For the RB radiating elements 130, since the dimension of the director 140 is relatively small such that it is difficult to excite a current within the RB in the director 140, the impact of the directors 140 on the radiation pattern of the radiating element 130 is small and may be ignored.

Each director 140 is configured to be frequency selective such that they will be substantially invisible to at least a portion of the electromagnetic radiation (e.g., having a given frequency) emitted by the SB radiating element 120. Therefore, the impact of the directors 140 on the electromagnetic radiation emitted by the radiating elements 120 is reduced. As shown in FIG. 1D, in the illustrated embodiment, the director 140 includes capacitive elements 141 through 144 and inductive elements 145 through 148 that form the director 140. Each of the inductive elements 145 through 148 is connected in series between an adjacent pair of capacitive elements, and each of the capacitive elements 141 through 144 is connected in series between an adjacent pair of inductive elements, such that an LC series resonant circuit is formed in the director 140, and the circuit is a loop. The resonant frequency of the resonant circuit may be within or outside of the VB. In an embodiment, the resonant frequency may be the center frequency (e.g., 2.3 GHZ) of the VB. In an embodiment, the passband of the resonant circuit includes at least a portion of the VB and does not include at least a portion of the SB, such that the resonant circuit may attenuate a current within at least a portion of the SB and substantially not attenuate a current within at least a portion of the VB. Accordingly, the director 140 is substantially invisible to electromagnetic radiation within at least a portion of the SB. In an embodiment, the passband of the resonant circuit includes at least a portion of the VB and does not include the entire SB, such that the resonant circuit may attenuate a current within the entire SB and substantially not attenuate a current within the at least a portion of the VB. Accordingly, the director 140 is substantially invisible to electromagnetic radiation within the entire SB. The passband of the resonant circuit referred to herein may refer to the frequency band having a normalized amplitude greater than or equal to 0.7 in the amplitude-frequency curve of the resonant circuit.

Figure 7A:
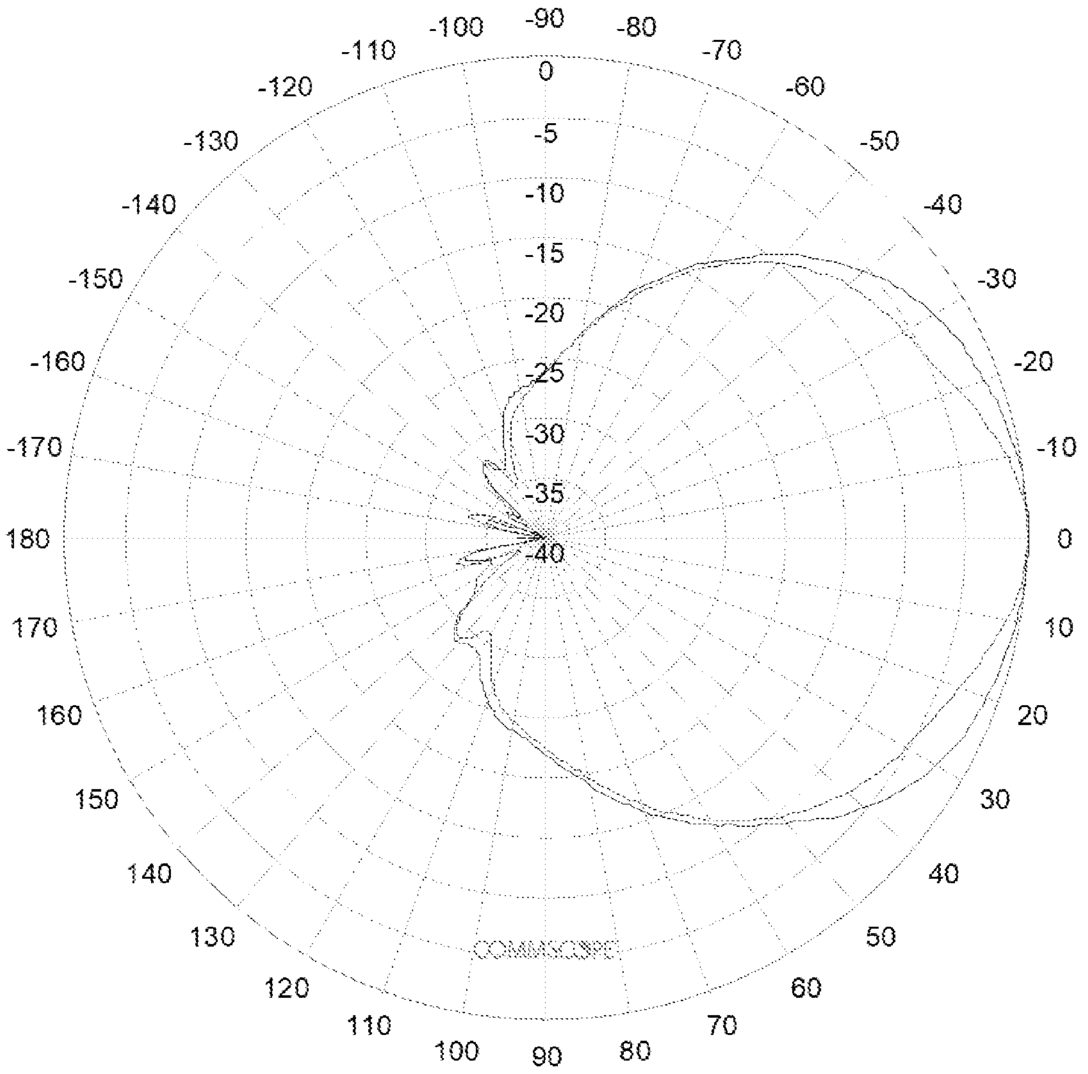
FIG. 7λ is a diagram schematically showing an intensity of electromagnetic radiation as a function of azimuth angle for: (i) one of the arrays of radiating elements in the multi-band antenna of FIG. 1A; and (ii) the same array of radiating elements with the director 140 replaced with the conventional director shown in FIG. 5.
FIG. 7B is a diagram schematically showing an intensity of electromagnetic radiation as a function of azimuth angle for: (i) one of the arrays of radiating elements in the multi-band antenna of FIG. 1A; and (ii) the same array of radiating elements with the director 140 replaced with the conventional director shown in FIG. 5.
Figure 7B:
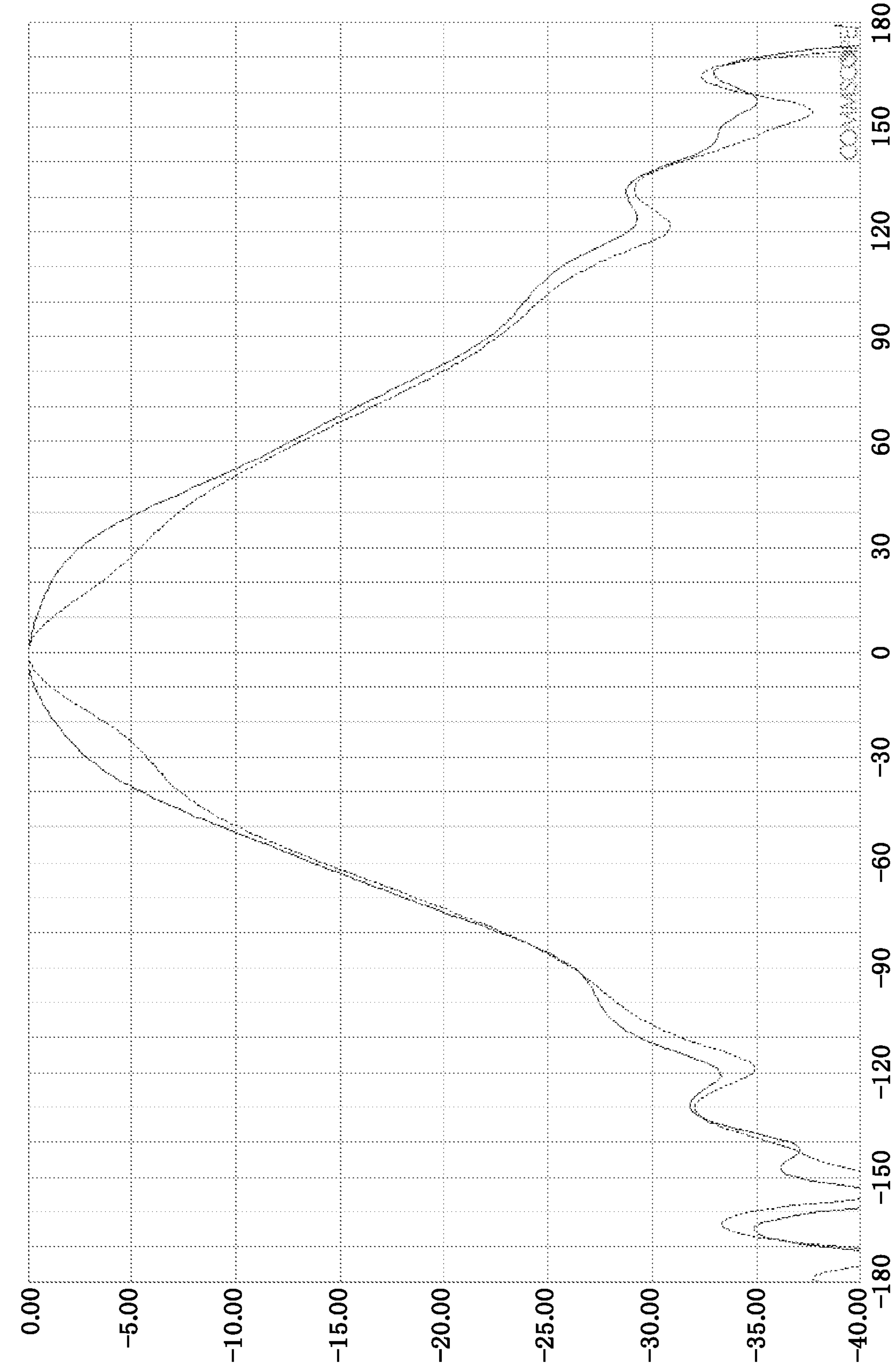

FIGS. 7A and 7B show the intensity of the electromagnetic radiation emitted by the array of SB radiating elements 120 in the antenna 100 at 3.5 GHz as a function of azimuth angle. The solid line in each figure corresponds to the intensity in the case where the VB radiating elements 110 are provided with the directors 140 shown in FIG. 1D, and the dotted line in each figure corresponds to the intensity in the case where the VB radiating elements 110 are provided with the conventional directors 520 shown in FIG. 5. It can be seen that the director 520 will cause a distortion of the radiation pattern of the array of SB radiating elements 120. After the VB radiating elements 110 are provided with the directors 140 shown in FIG. 1D, the radiation pattern of the array of the SB radiating elements 120 is obviously improved.

Surface currents in a director are mainly distributed at the edges of the director. Therefore, different shapes of directors lead to different distributions of surface currents, so as to lead to resonant circuits with different amplitude-frequency curves. In addition, in the LC series resonant circuit, the greater the number of LC circuits (for example, the number of LC circuits in the director 140 is 4), the steeper the amplitude-frequency curve of the resonant circuit and the narrower the passband of the resonant circuit. The shape of the director may be designed as needed so that the resonance strength of the resonant circuit formed in the director is sufficient to tune the radiation pattern of its associated radiating element, and at least a portion of the operating frequency band of the another radiating element is outside of the passband of the resonant circuit.

A process for designing a "cloaking" director for a first radiating element that has a first operating frequency band and is substantially invisible to a second radiating element having a second operating frequency band may include: determining a resonance frequency and a passband width of the resonant circuit that is formed in the director, determining the capacitance and inductance of the resonant circuit according to the resonance frequency and then determining the area(s) of the capacitive element(s) and the length(s) of the inductive element(s), and determining the number of LC circuits according to the passband width, such that the resonant circuit formed by connecting the capacitive element(s) and inductive element(s) may be substantially invisible to electromagnetic radiation within the second operating frequency band. The design process may then include adjusting the shape and dimension of each capacitive element and inductive element, the distance between two adjacent capacitive elements, the distance between a capacitive element and an adjacent inductive element, and the distance between the director and the first radiating element, such that the director including the resonant circuit may tune the radiation pattern and return loss of the first radiating element.

FIGS. 2A through 2F show front views of directors 210 through 260 (in some embodiments, any of these directors may be described as a parasitic element or a parasitic element assembly) according to embodiments of the present invention. An LC series resonant circuit is formed in each director, and the resonant circuit is a loop. The number of LC circuit included in the resonant circuit formed in each of the directors 210 through 240 is 4, the number of LC circuits of the resonant circuit formed in the director 250 is 2, and the number of LC circuits of the resonant circuit formed in the director 260 is 3. A capacitive element may be generally configured to be quadrangular, triangular, circular, fan-shaped, or irregularly shaped. Each inductive element is connected in series between an adjacent pair of capacitive elements. The inductive elements may have one or more bends so as to increase the electrical length thereof in a limited space between the adjacent pair of capacitive elements. In the illustrated embodiments, the directors formed the resonant circuit therein are quadrangular or circular. It will be appreciated the director formed the resonant circuit therein may be generally quadrangular, triangular, circular, fan-shaped, cross-shaped, T-shaped, L-shaped, or irregularly shaped.

In some embodiments, an LC series resonant circuit formed in a director may not be a loop. FIGS. 3A through 3D show front views of directors 310 through 340 (in some embodiments, any of these directors may be described as a parasitic element or a parasitic element assembly) according to embodiments of the present invention. An LC series resonant circuit is formed in each director, and the resonant circuit does not form a loop. The number of LC circuits of the resonant circuit formed in the director 310 is 4, the number of LC circuits of the resonant circuit formed in the director 320 is 3, and the number of LC circuits of the resonant circuit formed in the director 330 or 340 is 2. Each of the directors 310 through 340 includes a central capacitive element, and an inductive element of each LC circuit is connected in series between the central capacitive element and another capacitive element. In the illustrated embodiment, the central capacitive element as well as the remaining capacitive elements are rectangular. It will be appreciated that in other embodiments each with a non-loop resonant circuit, the central capacitive element and/or the remaining capacitive elements may be generally quadrangular, triangular, circular, fan-shaped, or irregularly shaped. The director as a whole may be generally quadrangular, triangular, circular, fan-shaped, cross-shaped, T-shaped, L-shaped, or irregularly shaped.

In some embodiments, a director that is associated with a first radiating element having a first operating frequency band that is substantially invisible to a second radiating element having a second operating frequency band includes one or more inductive elements formed therein. The inductance of each of the one or more inductive elements may be configured, such that the director has a higher impedance within the second operating frequency band and has a lower impedance within the first operating frequency band, so as to reduce a current within the second operating frequency band and substantially not reduce a current within the first operating frequency band.

Figure 6:
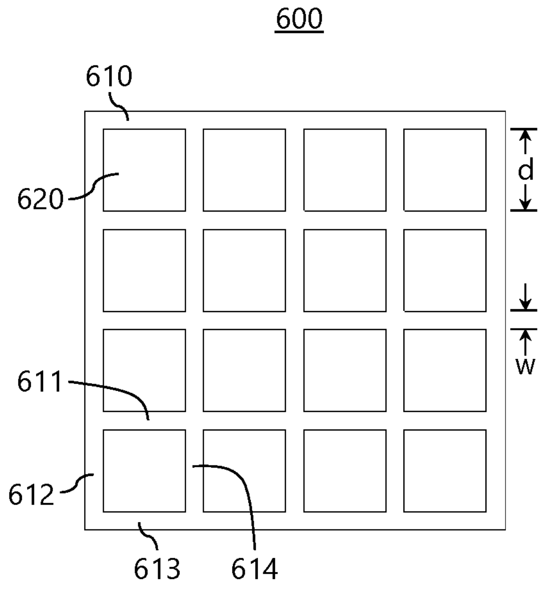
FIG. 6 is a front view schematically showing a director according to an embodiment of the present invention.

FIG. 6 shows a director 600 including one or more inductive elements formed therein. The one or more inductive elements are configured in a grid shape in which a plurality of inductive sections are connected to each other. The one or more inductive elements are formed by forming an array of holes in a conductor 610, such as a conductive plate, and the conductor portions located around the holes 620 are inductive sections 611 through 614. The holes 620 in the hole array are arranged to have a periodicity. In an embodiment, the number of holes 620 arranged along at least one direction (e.g., a horizontal direction, a vertical direction, a diagonal direction, or another oblique direction from the perspective shown in FIG. 6) is greater than or equal to 3. In the embodiment shown in FIG. 6, the hole array is a substantially square array formed by a plurality of holes 620, and the number of the holes 620 arranged in the horizontal or vertical direction is 4.

The dimension d of each hole 620 may be much smaller than a wavelength corresponding to a center frequency of the first operating frequency band of the radiating element associated with the director 600. The wavelength here may be the wavelength of electromagnetic waves in a vacuum or air, or the wavelength of electromagnetic waves in the director 600. In an embodiment, the dimension d of the hole 620 is smaller than 1/10 of the wavelength corresponding to the center frequency of the first operating frequency band. The width w of each of the inductive sections 611 through 614 may be much smaller than the dimension d of the hole 620. In an embodiment, the width w of each of the inductive sections 611 through 614 is smaller than 1/10 of the dimension d of the hole 620. The dimension d of the hole 620 herein may refer to the dimension of the hole 620 in any direction (e.g., a horizontal direction, a vertical direction, a diagonal direction, or another oblique direction from the perspective shown in FIG. 6). The width w of each of the inductive sections 611 through 614 herein may refer to a distance between two adjacent edges of two adjacent holes 620, or may refer to a distance from an edge of the director 600 to an adjacent hole 620. The shape, dimension, and arrangement of each hole 620 in the hole array may be designed so as to adjust the length and width of each inductive section 611 through 614, such that one or more inductive elements reduce a current within a second operating frequency band and substantially do not reduce a current within the first operating frequency band.

In the illustrated embodiment, the shape of the hole 620 is substantially square. It will be appreciated that, in other embodiments, the shape of the hole 620 may be a triangle, a rectangle, other polygons, a circle, an oval, or an irregular shape. In the illustrated embodiment, the hole array is a substantially square array formed of a plurality of holes 620. It will be appreciated that, in other embodiments, the hole array may be a rectangular array, a diamond array, a triangular array, a circular array, a cross array, or an irregularly-shaped array formed of a plurality of holes 620. In the illustrated embodiment, the director 600 is configured generally as a rectangle. It will be appreciated that, in other embodiments, the director 600 may be configured substantially as a quadrangle, a triangle, a circle, a sector, a cross, a T-shape, an L-shape, or an irregular shape.

Each of the directors (also referred to as a parasitic element or a parasitic element assembly) in any of the foregoing embodiments of the present invention may be formed of a metal plate or a printed circuit board with conductor(s) being printed on a dielectric board.

Figure 4A:
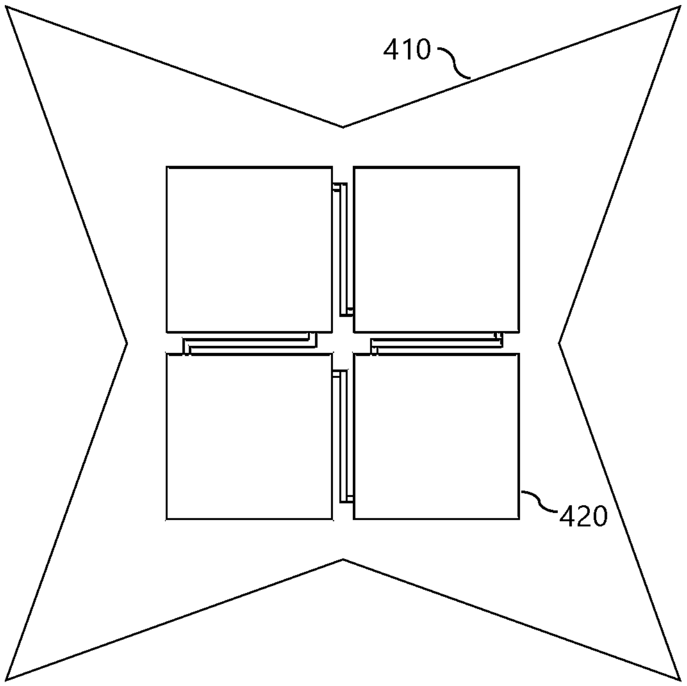
FIGS. 4A and 4B are front views schematically showing radiating element assemblies according to embodiments of the present invention.
Figure 4B:
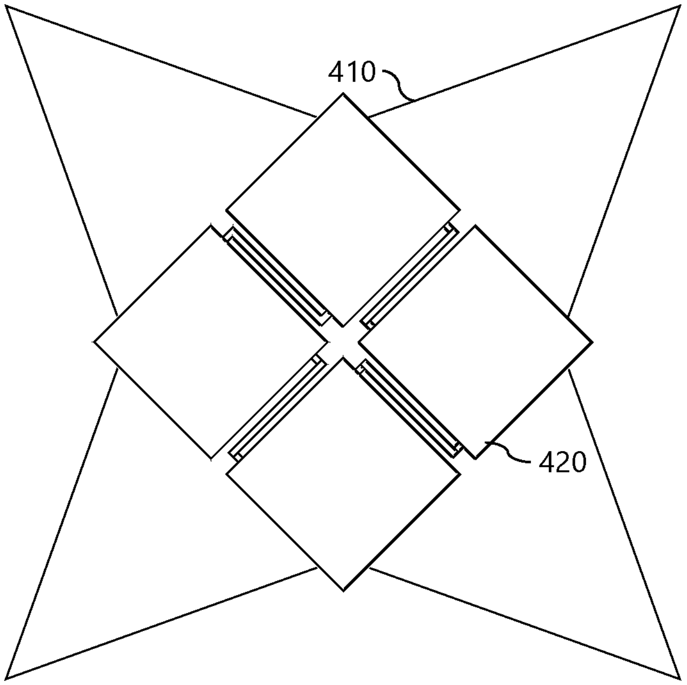

The radiating element assembly according to embodiments of the present invention, as shown in FIGS. 4A and 4B, is configured to receive an input signal and emit a first electromagnetic radiation within a first frequency band. The radiating element assembly includes a radiating element 410 and a director 420 (also referred to as a parasitic element or a parasitic element assembly). The radiating element 410 is configured to receive the input signal and emit a first radiating component.

The director 420 is configured to receive a first portion of the first radiation component and emit a second radiation component, such that a second portion of the first radiation component and the second radiation component combine to form at least a portion of the first electromagnetic radiation. In an embodiment, the director 420 is positioned near a maximum radiation direction of the first radiation component and is further configured to resonate at a first frequency so as to tune a pattern of the first electromagnetic radiation. In an embodiment, the director 420 is configured to be frequency selective, such that the director 420 reduces a current at a given frequency. Each of the directors in any of the foregoing embodiments and their associated radiating elements may be combined to form a radiating element assembly.

The director 420 in the radiating element assembly may be oriented at an arbitrary angle with respect to the radiating element 410. In the case that the radiating element is a crossed dipole radiating element 410, a diagonal of the director 420 is at an angle within a range of 0 to 45 degrees relative to a diagonal of the radiating element 410. A diagonal of the radiating element 410 may be a line connecting the tail end of one radiating arm in a dipole to the tail end of the other radiating arm in the dipole of the radiating element 410. In the embodiment shown in FIG. 4A, the diagonal of the director 420 may be aligned with the diagonal of the radiating element 410, that is, the diagonal of the director 420 is at a 0 degree angle relative to the diagonal of the radiating element 410. In the embodiment shown in FIG. 4B, the diagonal of the director 420 and the diagonal of the radiating element 410 have an included angle of around 45 degrees. Other angles are possible.

Accordingly, as described hereinabove, an enhanced multi-band antenna 100 includes a first radiating element 110, which is configured to emit first electromagnetic radiation in response to at least one feed signal having a frequency within a first radio frequency (RF) band. A director 140 is also provided, which is positioned forwardly of the first radiating element 110, and directly in a path of the first electromagnetic radiation. The director 140 includes first and second passive impedance elements (e.g., Land C), which provide respective first and second frequency-dependent reactances to first currents, which are induced within the director 140 in response to the first electromagnetic radiation. As will be understood by those skilled in the art, an impedance $Z_L$ of an inductor L can be specified as $Z_L=R_L+j_wL$, and an impedance $Z_C$ of a capacitor C can be specified as $Z_C=R_C+1/j_wC$, where $R_L$ and $R_C$ are the built-in resistances of the inductor and capacitor, wL and $1/_wC$ are the reactances of the inductor and capacitor, and w is the angular frequency of the electromagnetic radiation.

As shown by FIG. 1D, the director 140 may be configured to include a plurality of passive impedance elements L and C that are connected within a closed impedance loop, which contains a fourth LC circuit (148, 144) in series with a third LC circuit (147, 143) in series with a second LC circuit (146, 142) in series with a first LC circuit (145, 141). And, as shown by FIGS. 1D and 2A-2F, the geometric shape of the capacitors in the LC circuits may be selected from a group consisting of four-sided polygons (e.g., rectangles, diamond-shape), triangles, circles, and circular sectors.

Figure 1B:
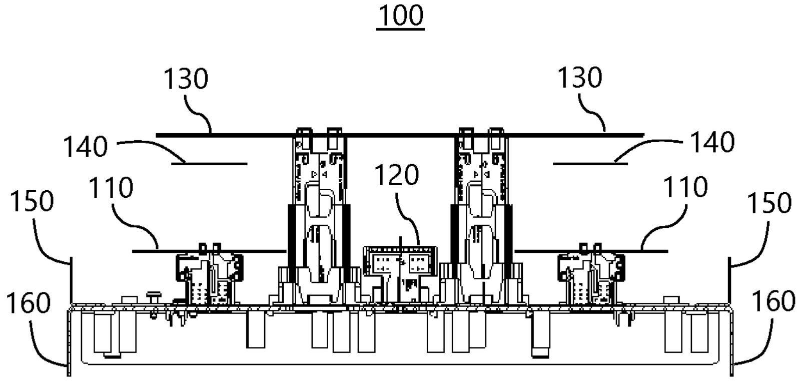
Figure 1C:
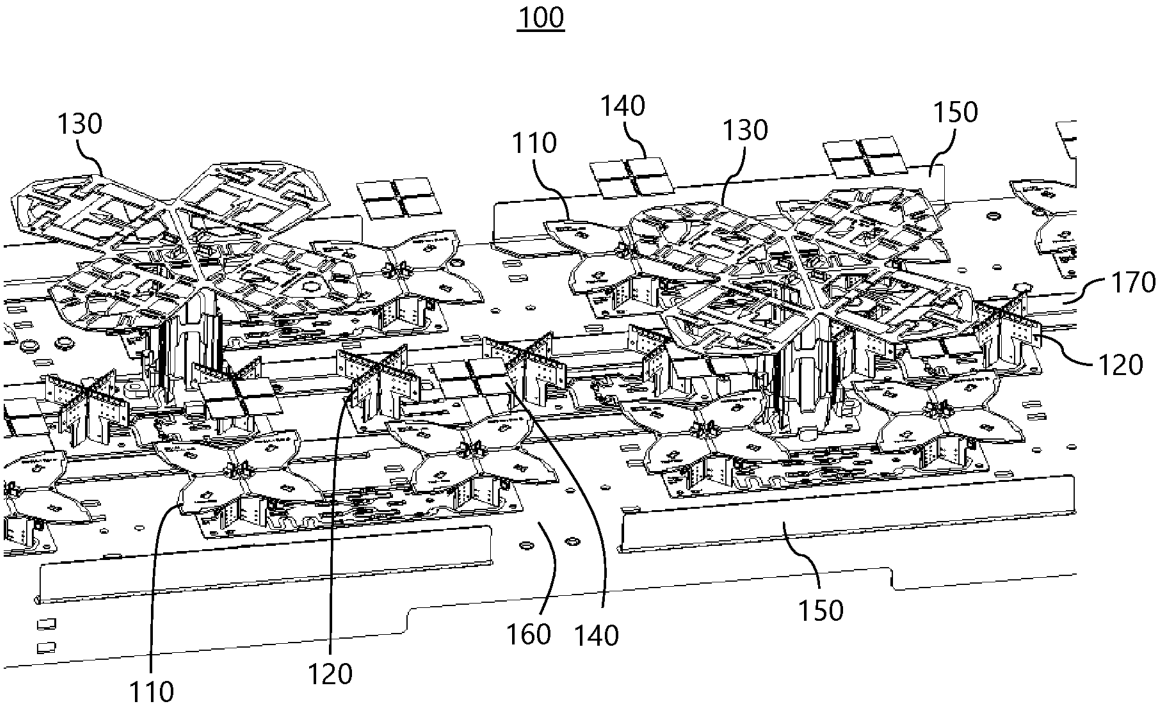
Figure 1D:
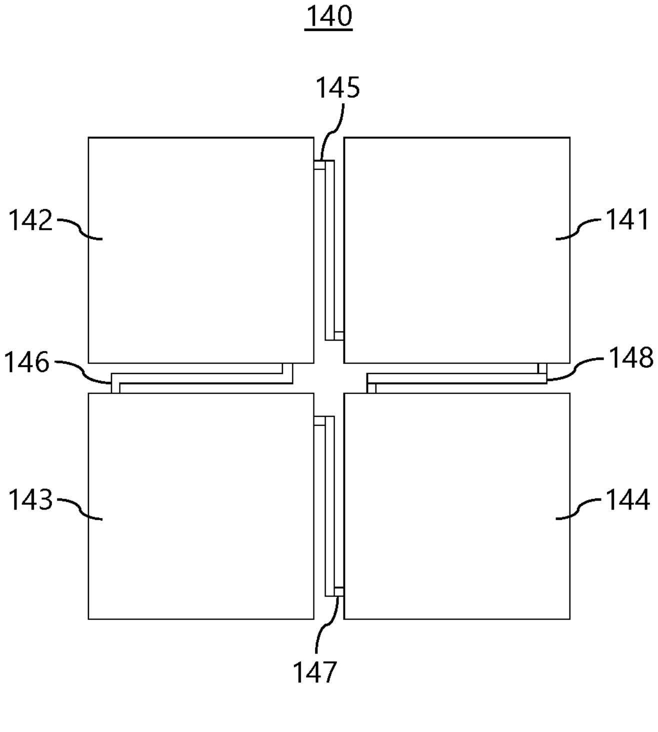
Figure 2A:
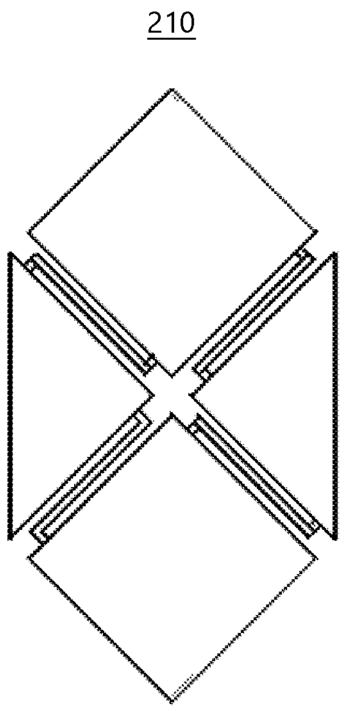
FIGS. 2A through 2F are front views schematically showing directors according to additional embodiments of the present invention.
Figure 2B:
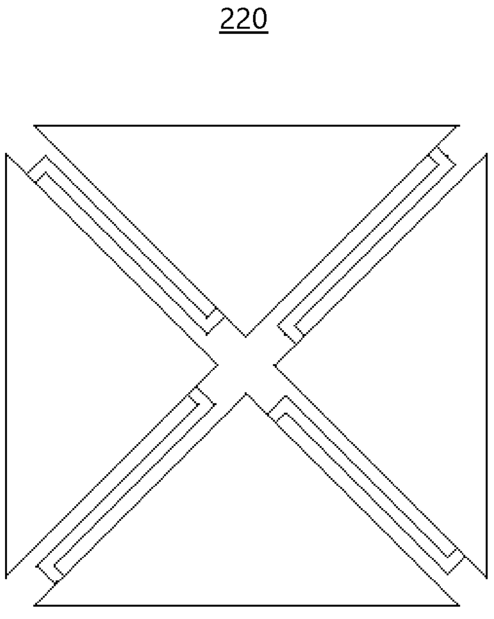
Figure 2C:
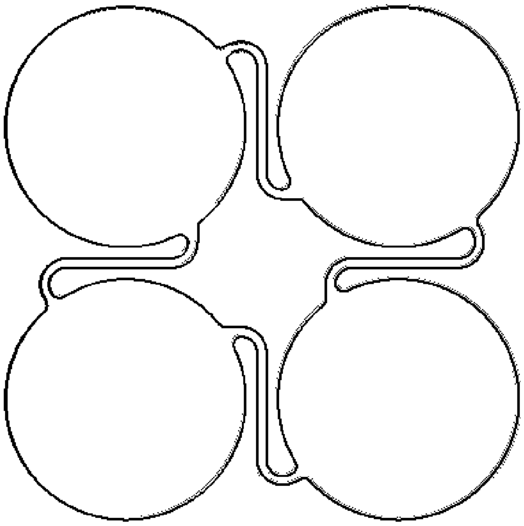
Figure 2D:
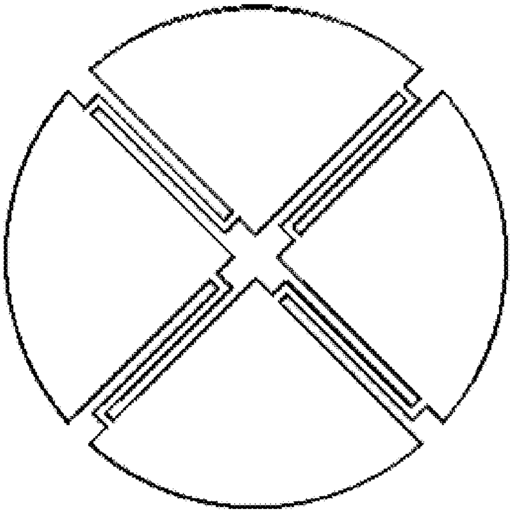
Figure 2E:
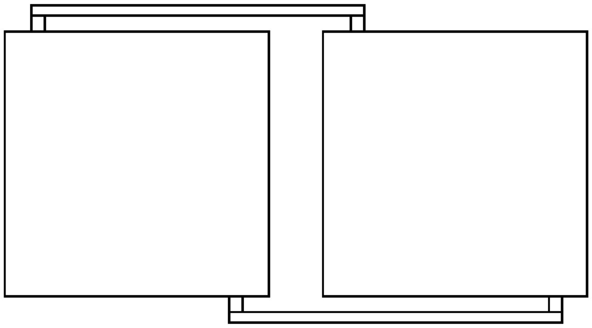
Figure 2F:
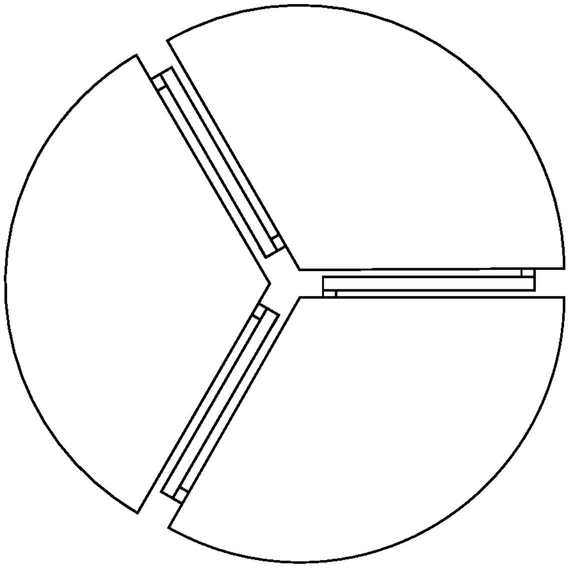
Figure 3A:
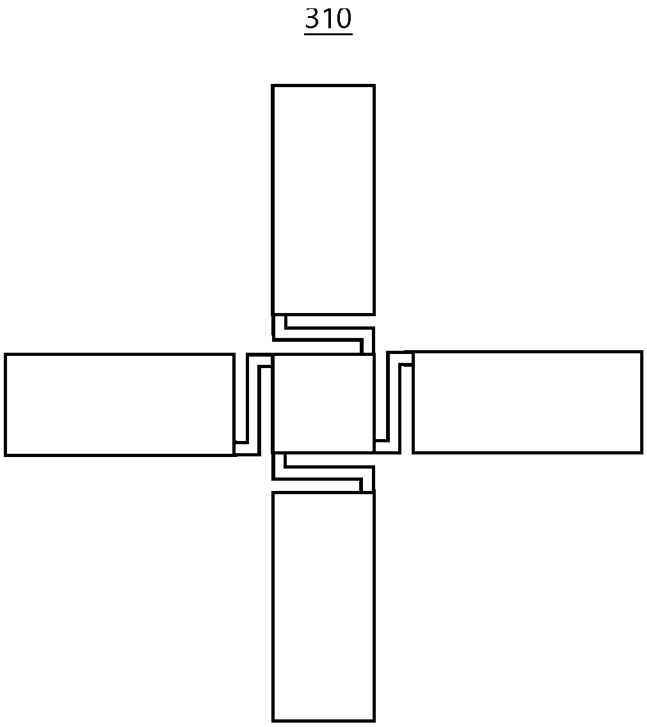
FIGS. 3A through 3D are front views schematically showing directors according to additional embodiments of the present invention.
Figure 3B:
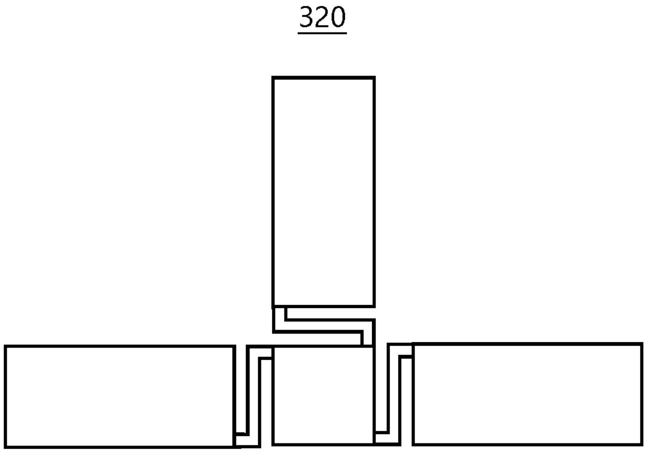
Figure 3C:
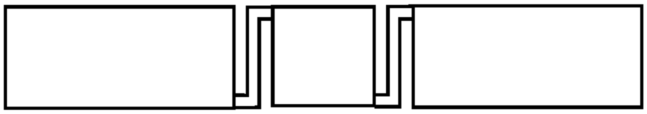
Figure 3D:
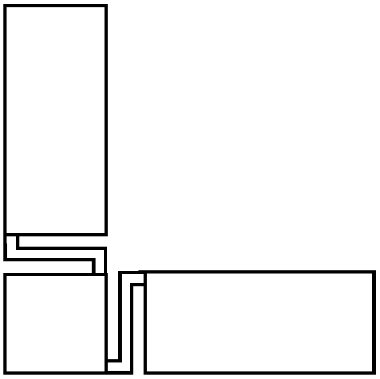

As further shown by FIGS. 1A-1C, a multi-band antenna 100 includes: (i) a reflector 160, (ii) a first array of first radiating elements 110, which extend in a lengthwise direction along a first side of the reflector 160, and (iii) a second array of first radiating elements 100, which extend in a lengthwise direction along a second side of the reflector 160. An array of second radiating elements 120 is also provided, which extends in a lengthwise direction across the reflector 160, and between the first and second arrays of first radiating elements 110. An array of directors 140 is provided, which extends forwardly of the first radiating elements 110 within the first array. The directors 140 are configured to include respective closed resonant loops of inductor and capacitor elements connected in series. Advantageously, each of the resonant loops provides a frequency-dependent impedance that is greater with respect to second currents, which are induced within the resonant loops in response to radiation from the second radiating elements 120, relative to first currents, which are induced within the resonant loops in response to radiation from the first radiating elements 110.

As shown by FIG. 6, a director 600 is provided, which includes a two-dimensional grid-shaped inductor (e.g., with inductor segments 611-614). In some of these embodiments, the two-dimensional grid-shaped inductor has a two-dimensional array (e.g., 4×4) of openings 620 therein. And, a side dimension of the openings 620 may be equal to $\lambda/10$, where $\lambda$ is equivalent to a wavelength of a center frequency within the first electromagnetic radiation. The two-dimensional array of openings 620 may be larger than a two-by-two array of openings.

Although some specific embodiments of the present invention have been described in detail with examples, it should be understood by a person skilled in the art that the above examples are only intended to be illustrative but not to limit the scope of the present invention. The embodiments disclosed herein can be combined arbitrarily with each other, without departing from the scope and spirit of the present invention. It should be understood by a person skilled in the art that the above embodiments can be modified without departing from the scope and spirit of the present invention. The scope of the present invention is defined by the attached claims.

That which is claimed is:

1. An antenna, comprising:

a first radiating element configured to emit first electromagnetic radiation in response to at least one feed signal having a frequency within a first radio frequency (RF) band; and a director positioned forwardly of the first radiating element and in a path of the first electromagnetic radiation, said director comprising a plurality of passive impedance elements that provide frequency-dependent reactances to currents induced within the director in response to the first electromagnetic radiation, said plurality of passive impedance elements including a primary capacitive element, a first series LC circuit electrically coupled to a first portion of the primary capacitive element, and a second series LC circuit electrically coupled to a second portion of the primary capacitive element.

2. The antenna of claim 1, wherein the first series LC circuit includes a first inductor electrically connected to the first portion of the primary capacitive element; and wherein the second series LC circuit includes a second inductor electrically connected to the second portion of the primary capacitive element.

3. The antenna of claim 2, wherein a geometric center of the primary capacitive element is generally aligned to a geometric center of a forward facing surface of the first radiating element when viewed from a plan perspective.

4. The antenna of claim 3, wherein the primary capacitive element is rectangular shaped; wherein the first portion of the primary capacitive element extends adjacent a first corner of the primary capacitive element; and wherein the second portion of the primary capacitive element extends adjacent a second corner of the primary capacitive element.

5. The antenna of claim 3, wherein the primary capacitive element is square shaped; wherein a capacitive element within the first series LC circuit is rectangular shaped; and wherein a capacitive element within the second series LC circuit is rectangular shaped.

6. The antenna of claim 2, wherein a geometric center of a capacitive element within the first series LC circuit extends in a first direction relative to a geometric center of the primary capacitive element; and wherein a geometric center of a capacitive element within the second series LC circuit extends in a second direction relative to the geometric center of the primary capacitive element.

7. The antenna of claim 6, wherein the first and second directions are generally perpendicular to each other when viewed from a plan perspective.

8. The antenna of claim 6, wherein the first and second directions are generally opposing directions when viewed from a plan perspective.

9. The antenna of claim 2, wherein said plurality of passive impedance elements include a third series LC circuit electrically coupled to a third portion of the primary capacitive element.

10. The antenna of claim 9, wherein said plurality of passive impedance elements include a fourth series LC circuit electrically coupled to a fourth portion of the primary capacitive element.

11. The antenna of claim 10, wherein the primary capacitive element is rectangular shaped; and wherein the first, second, third and fourth portions of the primary capacitive element correspond to first, second, third and fourth sides thereof, respectively.

12. The antenna of claim 2, wherein the primary capacitive element is rectangular shaped; wherein the first portion of the primary capacitive element extends adjacent a first corner of the primary capacitive element; and wherein the second portion of the primary capacitive element extends adjacent a second corner of the primary capacitive element.

13. The antenna of claim 2, wherein a capacitive element within the first series LC circuit has a greater area relative to an area of the primary capacitive element.

14. The antenna of claim 13, wherein a capacitive element within the second series LC circuit has an area equivalent to an area of the capacitive element within the first series LC circuit.

15. The antenna of claim 1, further comprising:

a reflector;

a first array of radiating elements extending in a lengthwise direction along a first side of the reflector;

a second array of radiating elements extending in a lengthwise direction along a second side of the reflector; and a third array radiating elements extending in a lengthwise direction across the reflector, and between the first and second arrays of radiating elements;

wherein the radiating elements in the first and second arrays are configured as the first radiating element; and wherein the director is within an array of directors extending forwardly of the radiating elements within the first array.

16. An antenna, comprising:

a reflector;

a radiating element extending forwardly of the reflector; and a director positioned forwardly of the radiating element, said director comprising a plurality of passive impedance elements that provide frequency-dependent reactances to currents induced therein responsive to electromagnetic radiation generated by said radiating element, said plurality of passive impedance elements including a primary capacitive element, a first series LC circuit having a first inductor therein electrically connected to a first portion of the primary capacitive element, and a second series LC circuit having a second inductor therein electrically connected to a second portion of the primary capacitive element.

17. The antenna of claim 16, wherein a geometric center of the primary capacitive element is generally aligned to a geometric center of a forward facing surface of the radiating element when viewed from a plan perspective.

18. The antenna of claim 17, wherein a geometric center of a capacitive element within the first series LC circuit extends in a first direction relative to the geometric center of the primary capacitive element;

wherein a geometric center of a capacitive element within the second series LC circuit extends in a second direction relative to the geometric center of the primary capacitive element; and wherein the first and second directions are generally perpendicular to each other when viewed from the plan perspective.

19. The antenna of claim 16, wherein an area of a capacitive element within the first series LC circuit is greater than an area of the primary capacitive element.

20. The antenna of claim 16, wherein said plurality of passive impedance elements further include: (i) a third series LC circuit electrically coupled to a third portion of the primary capacitive element; and (ii) a fourth series LC circuit electrically coupled to a fourth portion of the primary capacitive element.

* * * * *